INVENTOR
Salvatore A. Guerrieri
BY
*Marn & Jangarathis*
ATTORNEYS

United States Patent Office 3,524,819
Patented Aug. 18, 1970

3,524,819
STEAM REFORMING OF HYDROCARBONS
Salvatore A. Guerrieri, Rowayton, Conn., assignor to The Lummus Company, New York, N.Y., a corporation of Delaware
Filed Mar. 3, 1967, Ser. No. 620,373
Int. Cl. C01b 2/16, 2/22
U.S. Cl. 252—373
7 Claims

ABSTRACT OF THE DISCLOSURE

A process for steam reforming a hydrocarbon, such as methane, by passing a feed of the hydrocarbon and steam through a bed of a stream refroming catalyst at a superficial velocity that is sufficient to effect fluidization of the catalyst. The steam reforming may be effected at higher temperatures and pressures than previously employed, e.g. between 1400 F. and 2300° F. and between 50 p.s.i.g. and 600 p.s.i.g., and the reaction temperature is maintained by continuously circulating the catalyst through a heater wherein the catalyst is maintained in a fluidized state and heated by direct heat transfer with a hot flue gas.

---

This invention relates generally to the steam reforming of hydrocarbons, and more particularly, to the steam reforming of a light hydrocarbon to produce a hydrogen rich gas.

The steam reforming of hydrocarbons, such as methane, ethane, propane, butanes, light naphthas, and the like, in externally heated catalyst tubes, to produce a hydrogen rich gas, is known in the art. In general, a hydrocarbon steam mixture in the proper proportion is introduced into a reformer furnace, containing a plurality of parallel tubes packed with a suitable reforming catalyst. The tubes are externally heated to provide the endothermic heat of reaction for the reforming process, with the reaction generally being effected at a temperature of about 1600° F.

The above process has numerous problems, especially the problem of effecting economical heat transfer through the tubes at the high temperatures and heat fluxes employed in the steam reforming process. For example, in order to withstand the high temperatures used in steam reforming, expensive heat resistant alloys must be used in constructing the furnace, thereby raising capital costs. Moreover, the temperatures and pressures which may be employed in steam reforming is limited by the properties of these alloys, not by what is optimum for the process. The heat transfer problem may be further aggravated by unequal gas flow through the tubes which causes hot spots that reduce both tube and catalyst life. Since gas distribution through the tubes is affected by the catalyst packing in each tube, and since this is likely to differ from tube to tube, the splitting of the reformer feed into a large number of equal parallel streams is very difficult.

Accordingly, an object of this invention is to provide a new and improved process for steam reforming of hydrocarbons.

Another object of this invention is to provide a new process for steam reforming hydrocarbons that eliminates heat transfer problems.

A further object of this invention is to provide a more efficient process for steam reforming hydrocarbons.

Figure 1:
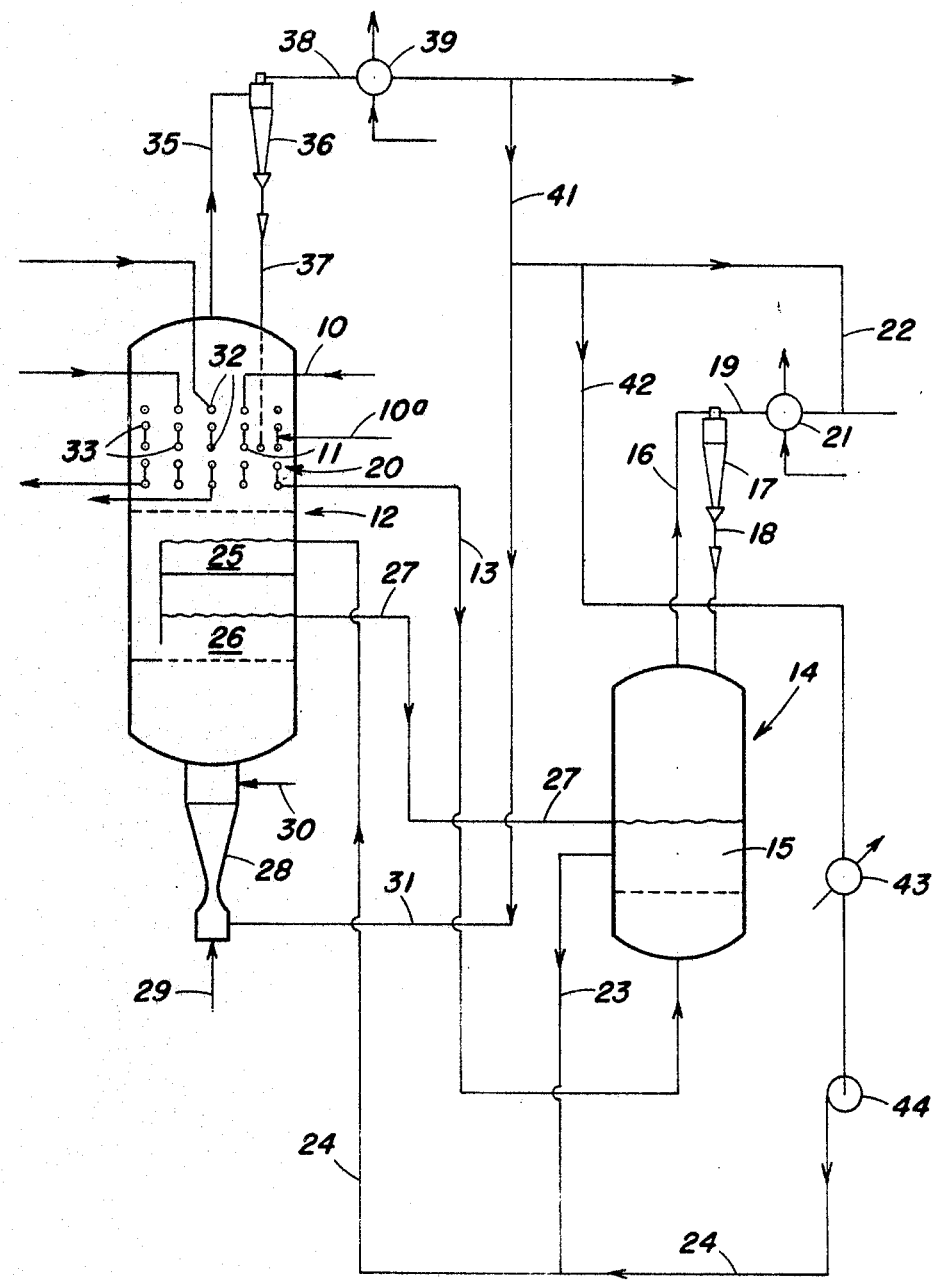
Figure 2:
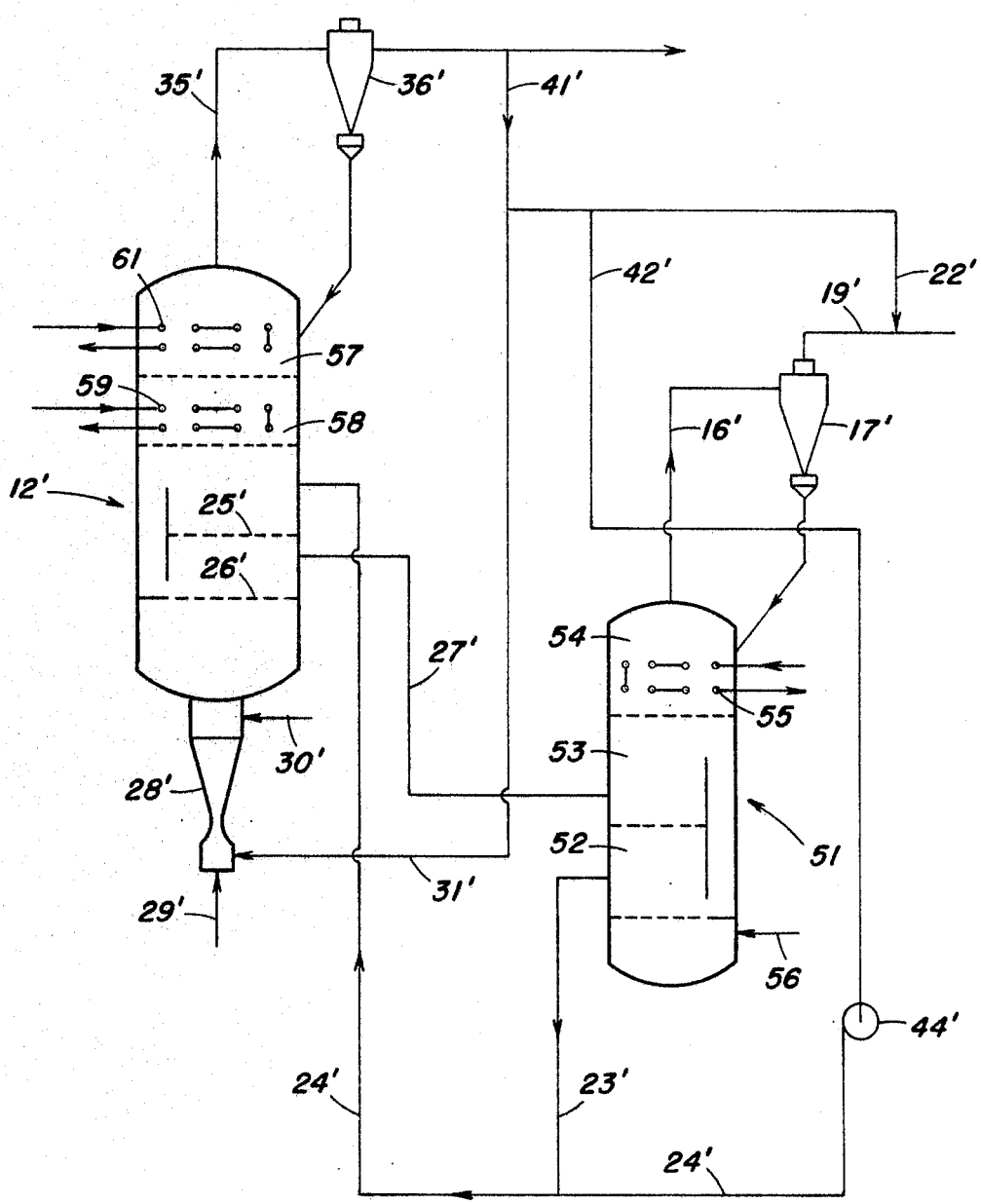

These and other objects will become more readily apparent from the following detailed descriptoin of the invention when read with reference to the accompanying drawings wherein:

FIG. 1 is a schematic representation of an embodiment of the process of the invention; and FIG. 2 is a schematic representation of another embodiment of the invention.

The objects of this invention are broadly accomplished by effecting steam reforming of a hydrocarbon in a fluidized catalyst bed. The steam reforming operation is preferably effected in a fluidized catalyst bed having a density between about 10 and about 30 lbs./cu. ft., at high temperatures and pressures, e.g., between about 1400° F. and about 2300 °F,. and between about 50 p.s.i.g. and about 600 ps.i.g., with steam-to-hydrocarbon ratios ranging between about 1.5:1 and about 3.5:1. The exact choice of conditions, however, is dependent upon the particular hydrocarbon feed stock and product desired. The reaction temperature may be maintained by circulating the catalyst through a suitable catalyst heater, preferably a heater wherein the catalyst is maintained in a fluidized state.

The catalyst employed is a conventional steam reforming catalyst and preferably one which is capable of withstanding high temperatures, such as pulverized nickel, nickel alloys, thorium dispersed nickel and the like. The catalyst is employed in a finely divided state and generally has an average particle size ranging from about 40 to about 80 microns. It should be readily apparent, however, that the optimum catalyst size will vary with each catalyst and the selection of the proper catalyst size is well within the scope of one skilled in the art from the teachings of the invention.

The invention will be further described with reference to the specific embodiments illustrated in the drawings. The equipment is schematically represented and equipments such as valves, and the like, have been omitted to simplify the description. The choice of specific equipment is deemed to be well within the scope of a person skilled in the art from the description of the invention. Thus, for example, it should be readily apparent that the reactor and catalyst heater vessel should be constructed of materials capable of withstanding the high temperature and pressure conditions employed in the process, e.g., a refractory lined steel.

Referring to FIG. 1, a gaseous feed for a steam reforming process, containing steam and a hydrocarbon such as methane, in line 10 is introduced into a tubular coil 11, located in a heat recovery section which is the upper portion of a catalyst heater 12. Alternatively, steam is introduced via line 10a into the hydrocarbon feed after it has passed part-way through preheater coil 11. The coil 11 is immersed in a fluidized bed 20 and the feed is heated in the coil 11 by indirect heat transfer with a gas rising from the bottom of the catalyst heater, as hereinafter more fully described.

Preheated feed, for example at a temperature between about 700° and about 1100° F., is withdrawn from the coil 11 in the catalyst heater 12 through line 13 and introduced into a reactor 14, containing a finely divided bed of a suitable reforming catalyst, such as alumina supported nickel, e.g., 4–7 wt. percent nickel supported on high purity alumina as sold under the trademark C–14 by C.C.I., and generally indicated as 15. The feed is introduced into the reactor 14 at a superficial velocity that is sufficient to fluidize the catalyst bed, generally in the order of about 1 to about 5 ft./sec. The fluidized catalyst bed is maintained at a temperature sufficient to effect steam reforming of the hydrocarbon, preferably a temperature between about 2000° F. and about 2300° F., as hereinafter more fully described.

A gaseous effluent, containing carbon monoxide and hydrogen, is withdrawn from the reactor 14 through line 16 and introduced into a cyclone separator 17 to remove any catalyst particles entrained therein. The separated catalyst particles are withdrawn from the cyclone separator 17 through line 18 and returned to the reactor 14. A solid-free effluent is withdrawn from the cyclone separator 17 through line 19, passed through a waste heat boiler, generally indicated as 21 to recover heat and quench the reaction product, and passed to further processing (not shown). If the effluent in line 19 is to be used as a synthesis gas for the production of ammonia, a flue gas in line 22, obtained from the catalyst heater 12, as hereinafter more fully described, may be added thereto, in the proper proportions, to meet the nitrogen requirements for the ammonia synthesis. Alternatively, air in suitable amount may be introduced into reactor 14 (not shown).

Catalyst in the reactor 14 is continuously withdrawn therefrom through line 23 and combined with a flue gas in line 24, with the gas functioning as a pneumatic carrier for passing the catalyst to the catalyst heater 12.

The catalyst heater 12 contains fluidized catalyst beds 25 and 26, and the catalyst and flue gas in line 24 are introduced into the fluidized catalyst bed 25 to effect heating thereof. It is to be understood, however, that only two catalyst beds are illustrated in order to facilitate the understanding of the embodiment and additional beds may be employed depending on results desired. The thermal efficiency of the process increases with an increasing number of beds.

The catalyst is reheated in beds 25 and 26 to a final temperature between about 2300° F. and about 2500° F. by a hot flue gas rising from the bottom of the catalyst heater, as hereinafter more fully described. The partially heated catalyst in fluidized bed 25 overflows into the fluidized bed 26 and is further heated therein, by the rising flue gas, generally to a temperature between about 2300° F. and about 2500° F., the maximum temperature being that which the particular catalyst can take without damage. Heated catalyst is withdrawn from the fluidized catalyst bed 26 through line 27, and introduced into the reactor 14 to supply the heat of reaction for the steam reforming being effected therein.

The flue gas employed for heating the catalyst in the catalyst heater 12 is supplied by a burner 28 located at the bottom of the catalyst heater 12. More particularly, air in line 29 is introduced into the burner 28 and combined with a fuel, either a hydrocarbon gas or a hydrocarbon liquid, introduced through line 30. Combustion is effected in the burner 28 without excess air to produce an oxygen-free flue gas at a temperature which is at about the theoretical flame temperature of the feed.

The hot flue gas is passed from the burner 28 upwardly through the catalyst beds 26 and 25 at a superficial velocity sufficient to effect fluidization thereof. In many cases, the catalyst is not rugged enough to withstand the temperature conditions which would exist if the flue gas is passed therethrough at the theoretical flame temperature. In such an event, the air which is introduced into the burner 28 through line 29 aspirates a cooled flue gas into the burner 28 through line 31. The cooled flue gas in line 31 is introduced in a quantity sufficient to reduce the temperature of the combustion products gas stream introduced into the catalyst bed 26 to an acceptable level, generally to about 200° F. to about 500° F. above the temperature of the catalyst withdrawn from bed 26. The flue gas passes through catalyst beds 26 and 25 to effect heating of the catalyst, as hereinabove described, with concurrent cooling of the flue gas. The partially cooled flue gas is withdrawn from the fluidized catalyst bed 25 and flows through the catalyst bed 20 at a superficial velocity sufficient to effect fluidization thereof. The steam reforming feed flowing through coil 11, immersed in the fluidized catalyst bed 20, is heated by indirect heat transfer with the rising flue gas, as hereinabove described. The upper portion of the catalyst heater 12 may also be provided with coils 32 and 33, immersed in the fluidized bed 20, through which flow suitable heat transfer medium for recovering heat from the flue gas. Thus, for example, steam to be superheated is passed through coil 33 and water to be vaporized is passed through coil 32.

The cooled flue gas is withdrawn from the catalyst heater 12 through line 35 and introduced into a cyclone separator 36 to remove any catalyst particles entrained therein. The separated catalyst particles are withdrawn from the cyclone separator 36 through line 37 and returned to the catalyst heater 12. A solid-free flue gas is withdrawn from cyclone separator 36 through line 38, passed through a waste heat boiler 39, and a portion thereof passed to a stack (not shown), preferably via an expander turbine (not shown). The remaining portion of flue gas in line 38 is passed through line 41, with a first portion thereof being passed through line 31 for introduction into the burner 28, as hereinabove described. A second portion of the flue gas in line 41 is passed through line 42 and cooler 43, if necessary, to a compressor 44. The compressed flue gas is withdrawn from compressor 44 through line 24 and pneumatically passes the catalyst to the catalyst heater 12, as hereinabove described.

A portion of the flue gas in line 41 may be passed, if necessary, through line 22 for combination with the effluent from the reactor 14 in line 19, as hereinabove described.

Another embodiment of the process of the invention is illustrated in FIG. 2. The embodiment illustrated in FIG. 2 operates similarly to the embodiment illustrated in FIG. 1, except that the steam reforming feed is preheated in the steam reforming reactor instead of in the catalyst heater. Accordingly, the portions of the embodiment illustrated in FIG. 2 which function similarly to those illustrated in FIG. 1 are indicated by like prime numerals.

Referring now to FIG. 2, there is provided a reactor 51, containing lower beds 52 and 53 and an upper bed 54, all comprised of a finely divided steam reforming catalyst. The upper bed 54 contains a coil 55 through which flows a suitable heat transfer medium, such as boiler feed water, for quenching reaction products, as hereinafter described. It is to be understood, however, that only two lower catalyst beds are illustrated to facilitate understanding of the embodiment and additional beds may be employed depending on results desired. The thermal efficiency of the process improves with an increasing number of beds.

The catalyst bed 53 is maintained at a temperature sufficient to effect steam reforming of a hydrocarbon, preferably a temperature between about 2000° F. and about 2300° F., by introducing heated catalyst through line 27'. The catalyst in line 27' is heated in catalyst heater 12', as hereinabove described with reference to FIG. 1. The catalyst in bed 53 overflows into the bed 52, which functions to preheat steam reforming feed, as hereinafter described. The catalyst in bed 52 is continuously withdrawn therefrom through line 23' and passed to the catalyst heater 12', as hereinabove described with reference to FIG. 1.

A gaseous steam reforming feed, containing steam and a hydrocarbon, in line 56 is introduced into the reactor 51 to a superficial velocity that is sufficient to fluidize catalyst beds 52, 53 and 54, generally in the order of about 1 to about 5 ft./sec. The feed passes upwardly through the fluidized catalyst bed 52 to effect heating of the feed, with concurrent cooling of the catalyst. As a result of the passage of the feed through the fluidized catalyst bed 52, the feed is preheated to a temperature between about 700° and about 1100° F. The preheated feed is then passed through the fluidized catalyst bed 53 and as a result of the contact with the heated catalyst, steam reforming of the feed is effected.

A gaseous product, containing carbon monoxide and hydrogen, is withdrawn from the fluidized catalyst bed 53 and passed through the fluidized catalyst bed 54. Boiler feed water flowing through the coil 55 is heated and vaporized by indirect heat transfer with the product flowing through the fluidized bed 54, with concurrent quenching of the product. The quenched product is withdrawn from the reactor 51 through line 16' and further treated, as hereinabove described with reference to FIG. 1, except that a waste heat boiler for quenching the product is no longer necessary.

The catalyst heater 12' functions in the same manner as described with reference to FIG. 1, except that the upper portion of the heater 12' contains two fluidized beds 57 and 58. The fluidized bed 58 contains a coil 59 for generating steam from boiler feed water and the fluidized bed 57 contains a coil 61 for superheating steam. The respective materials flowing through coils 59 and 61 are heated by indirect heat transfer with the flue gas passing through the fluidized beds 58 and 57, as described hereinabove with reference to FIG. 1.

The embodiment illustrated in FIG. 2 has several advantages over the embodiment illustrated in FIG. 1. Thus, for example, preheating of the feed is effected in contact with the catalyst thereby eliminating any chance of carbon formation during the preheating stage. In addition, quenching of the reaction effluent is effected in contact with the reforming catalyst instead of in a waste heat boiler, thereby eliminating the chance of carbon formation during the quenching step.

Numerous modifications of the process of the invention are possible without departing from the scope thereof. Thus, for example, solids other than the catalyst could be used in the heat recovery section of the catalyst heater, although the use of catalyst solids is preferred. In addition, the catalyst may be circulated between the reactor and the heater by a pneumatic carrier other than the flue gas, for example, a process off stream such as carbon dioxide. These and other modifications should be apparent to those skilled in the art from the teachings contained therein.

The following examples are illustrative of process conditions used in accordance with the invention, but the scope of the invention is not to be limited thereby:

EXAMPLE I (FIG. 1)

Quantities, lb./hr.:

Reactor feed (line 10): 128,000 (21 vol. percent natural gas, 79 vol. percent steam).
Reactor product (line 16): 128,000 (75 vol. percent $H_2$; 22 vol. percent $CO+CO_2$; 3 percent $CH_4+N_2$) dry basis.
Catalyst recirculation (line 27): 1,200,000
Steam generation and superheating coils 32 and 33: 208,000

Pressures, p.s.i.a.

| | |
|---|---|
| Reactor 14 and catalyst heater 12 | 360 |
| Steam generation (Coil 32) | 460 |

Temperatures, ° F.:

| | |
|---|---|
| Feed to preheat coil (line 10) | 560 |
| Feed to reactor (line 13) | 900 |
| Product from reactor (line 16) | 1800 |
| Catalyst from heater to reactor (line 27) | 2500 |
| Catalyst from reactor to heater (line 23) | 1800 |
| Boiler feed water (coil 32) | 290 |
| Superheated steam (coil 33) | 725 |

EXAMPLE II (FIG. 2)

Quantities, lb./hr.:

Reactor feed (line 56): 128,000 (21 vol. percent natural gas, 79 vol. percent $H_2O$).
Reactor product (line 16'): 128,000 (75 vol. percent $H_2$, 22 vol. percent $CO+CO_2$, 3 vol. percent $CH_4+N_2$) dry basis.
Catalyst recirculation (27'): 835,000
Steam generation and superheating: 200,000

Pressures, p.s.i.a.:

| | |
|---|---|
| Reactor 51 and catalyst heater 12' | 360 |
| Steam generation (coils 55 and 61) | 460 |

Temperatures, ° F.:

| | |
|---|---|
| Feed to reactor (line 56) | 560 |
| Product from reactor (line 16') | 1800 |
| Catalyst from reactor to heater (line 23') | 1500 |
| Catalyst from heater to reactor (line 27') | 2500 |
| Boiler feed water (coil 55) | 290 |
| Superheated steam (coil 59) | 725 |

The process of this invention is extremely effective for steam reforming a light hydrocarbon in that the process avoids the problems encountered in employing a steam reforming furnace, i.e., the difficulties involved in both effecting heat transfer through tubes at high temperatures and heat flux and in splitting the reformer feed into a large number of equal, parallel streams. Moreover, by proceeding in accordance with the process of this invention, steam reforming may be effected at temperatures and pressures higher than those heretofore employed in the art, resulting in improved economy. In addition, capital costs are reduced, since the use of expensive high temperature resistant alloys are minimized. Moreover, the use of finely divided catalyst, instead of the pellets heretofore employed, increases the exposed surface area per pound, which leads to a lower catalyst inventory and therefore, a lower investment cost.

Numerous modifications and variations of the present invention are possible in light of the above teachings. It is, therefore, to be understood that within the scope of the appended claims, the invention may be practiced otherwise than as specifically described.

What is claimed is:

1. In a process for steam reforming a hydrocarbon to produce a hydrogen-containing effluent, the improvement comprising:
introducing a mixture of steam and a hydrocarbon into a reforming zone containing a steam reforming catalyst at a superficial velocity sufficient to maintain the catalyst in a fluidized state; effecting reaction between the hydrocarbon and steam at steam reforming temperatures and pressures to produce a hydrogen-containing effluent; withdrawing steam reforming catalyst from the reforming zone; combining withdrawn catalyst with a flue gas, obtained as hereinafter described; conveying the catalyst by means of the flue gas into a catalyst heating zone; burning a fuel to produce a flue gas at an elevated temperature; introducing the flue gas into the heating zone at a superficial velocity sufficient to maintain the steam reforming catalyst therein in a fluidized state, said flue gas heating the steam reforming catalyst to steam reforming temperatures and resulting in partial cooling of the flue gas; withdrawing heated steam reforming catalyst from the heating zone and introducing the heated steam reforming catalyst into the reforming zone to maintain steam reforming temperatures therein; passing the partially cooled flue gas through a fluidized bed having cooling coils immersed therein to effect further cooling of the flue gas; withdrawing cooled flue gas from the fluidized bed and employing a portion of the flue gas for conveying steam reforming catalyst from the reforming zone to the heating zone.

2. The process as defined in claim 1 wherein the fuel is burned without excess air to produce an essentially oxygen-free flue gas for heating the catalyst in the heating zone.

3. The process as defined in claim 2 wherein another portion of the cooled flue gas withdrawn from the fluidized bed is admixed with the flue gas prior to introduction thereof into the heating zone to regulate the temperature of the flue gas to a temperature which is from 200° F. to about 500° F. higher than the temperature at which the catalyst is withdrawn from the heating zone.

4. The process as defined in claim 3 wherein the steam reforming catalyst is maintained as a plurality of fluidized beds in the heating zone, the catalyst being introduced into the upper bed and being withdrawn from the lower bed and the hot flue gas being passed from the lower bed to the upper bed.

5. The process as defined in claim 4 wherein the steam and hydrogen is passed through cooling coils immersed in the fluidized bed to effect preheating thereof prior to introduction into the reforming zone.

6. The process as defined in claim 1 wherein the reforming zone is divided into two zones each containing steam reforming catalyst, the steam reforming catalyst being introduced into the first zone, passed to the second zone and withdrawn from the second zone for passage to the heating zone, the steam and hydrocarbon mixture being introduced into the first zone and then passed to the second zone, the steam and hydrocarbon mixture maintaining the steam reforming catalyst in a fluidized state in said two zones, the steam and hydrocarbon mixture being heated to a temperature from about 700° to about 1100° F. in the first zone and to a temperature from about 1400° to about 2300° F. in the second zone.

7. The process of claim 6 and further comprising passing the hydrogen containing effluent to a quench zone, maintaining a fluidized bed of a steam reforming catalyst in the quench zone and passing a heat transfer medium in an indirect heat transfer relationship with the fluidized bed and the reaction effluent to effect cooling of the reaction effluent.

References Cited

UNITED STATES PATENTS

| | | | |
|---|---|---|---|
| 2,709,645 | 5/1955 | Hill et al. | 48—196 |
| 2,976,134 | 3/1961 | Paull | 48—214 X |
| 3,027,238 | 3/1962 | Watkins | 48—196 X |
| 3,197,284 | 7/1965 | Hoekstra | 48—196 X |
| 3,397,962 | 8/1968 | Squires | 252—373 X |

FOREIGN PATENTS 233,399  3/1958  Australia.

JOSEPH SCOVRONEK, Primary Examiner

U.S. Cl. X.R.

48—196, 214, 215